No. 871,317. PATENTED NOV. 19, 1907.
C. L. BETTS.
LANTERN TUBE.
APPLICATION FILED MAR. 23, 1907.
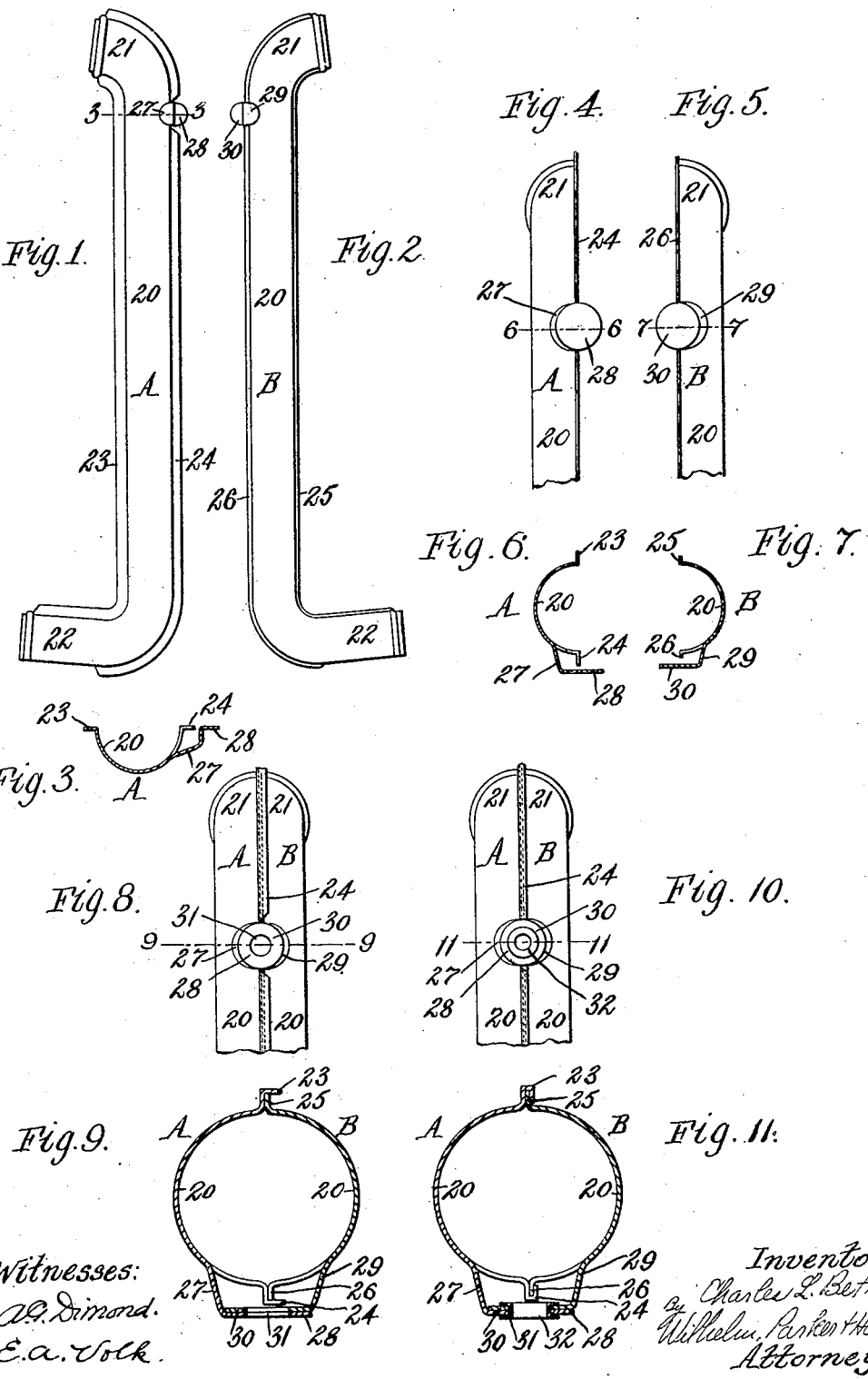

UNITED STATES PATENT OFFICE.

CHARLES L. BETTS, OF NEW YORK, N. Y., ASSIGNOR TO R. E. DIETZ COMPANY, OF NEW YORK, N. Y.

LANTERN-TUBE.

No. 871,317.  Specification of Letters Patent.  Patented Nov. 19, 1907.

Application filed March 23, 1907. Serial No. 364,053.

*To all whom it may concern:*

Be it known that I, CHARLES L. BETTS, a citizen of the United States, residing at New York, borough of Brooklyn, in the county of Kings and State of New York, have invented a new and useful Improvement in Lantern-Tubes, of which the following is a specification.

This invention relates to that class of lantern tubes in which each tube is composed of halves which are seamed or joined lengthwise on the inner and outer sides of the tubes, each half being stamped out of a blank of tin or other sheet metal.
The object of this invention is to provide the tubes in a simple and inexpensive manner with strong and durable bearings for the ends of the bail by which the lantern is carried.
In the accompanying drawings: Figures 1 and 2 are elevations of the halves of a tube, viewed flatwise. Fig. 3 is a horizontal section in line 3—3, Fig. 1. Figs. 4 and 5 are elevations, on an enlarged scale, of the halves, viewed edgewise. Figs. 6 and 7 are horizontal sections, respectively, in lines 6—6, Fig. 4, and 7—7, Fig. 5. Fig. 8 is a view of the upper portion of the tube viewed from the outer side, the view showing the halves placed against each other preparatory to securing them together. Fig. 9 is a horizontal section, on an enlarged scale, in line 9—9, Fig. 8. Fig. 10 is a view of the upper portion of the finished tube. Fig. 11 is a horizontal section, on an enlarged scale, in line 11—11, Fig. 10.

Like letters and numerals of reference refer to like parts in the several figures.

A and B represent the half tubes, each of which comprises an upright body portion 20, an upper elbow portion 21 and a lower elbow portion 22. These half tubes are half-round in section and secured together along their edges by any suitable means, for instance, as shown, by inner and outer marginal flanges 23 24, formed on the half tube A and bent around corresponding marginal flanges 25 26 formed on the half tube B.

The half tube A is provided near its upper elbow portion, at its outer edge, with a boss 27 formed with a lip 28, and the half tube B is provided with a corresponding boss 29 and lip 30. The outer marginal flanges 24 26 are cut away where the bosses and lips are formed on the half tubes. In each stamped half tube the lip extends from the boss in the same plane in which the adjacent marginal flange extends, or at right angles to the outermost portion of the boss, as represented in Figs. 1, 2 and 3. After the half tubes have been so stamped the lips 28 30 are bent so as to stand in line with the outer portion of the respective boss or crosswise of the marginal flange, as represented in Figs. 4—7. The lip on each half tube now projects beyond the plane on which the tube is divided or the half tubes are joined, so that when the half tubes are placed against each other in forming the tube, the lip of one half tube extends into the boss on the other half tube and lies against the outer portion of said boss, as represented in Figs. 8 and 9. The lip now forms a continuation of the outer flat portion of the boss and is preferably half-round in outline to correspond with the half-round shape of the boss on the opposing half tube. Each boss is provided in its flat outer portion with a central opening 31 for the insertion of the end of the bail and this opening is preferably reinforced by an eyelet 32 which forms a bearing for the bail and serves to secure the two bosses of the half tubes together.

In this improved construction each half tube is provided at its outer edge with a lip or ear portion which extends across the joint uniting the half tubes and which lies against a similar lip or ear portion on the companion half tube, the two adjacent lip or ear portions overlapping the joint in opposite directions and being provided with coinciding openings in which the end of the bail engages. The latter is thereby caused to engage two thicknesses of metal, one on each half tube, whereby the security, strength and durability of the attachment is greatly increased, and these qualities are further enhanced by the eyelet which secures the overlapping thicknesses together and which forms a smooth bearing for the bail end.

I claim as my invention:

1. A sheet metal tube composed of half tubes which are joined lengthwise on the inner and outer sides of the tubes and are provided at their contiguous edges each with a boss which has its outer flat portion arranged transversely to the joint and extending sidewise beyond the joint along the outer flat portion of the boss of the companion half tube, substantially as set forth.

2. A sheet metal tube composed of half tubes which are joined lengthwise on the inner and outer sides of the tube and are provided at their contiguous edges each with a transverse boss and a lip which extends transversely from the boss along the boss and lip of the companion half tube, substantially as set forth.

3. A sheet metal tube composed of half tubes which are joined lengthwise on the inner and outer sides of the tube and are provided at their contiguous edges each with a lip which is arranged transversely to the joint and extends transversely along the lip of the companion half tube, said lips being provided with coincident openings for the reception of the bail, substantially as set forth.

4. A lantern tube composed of half tubes which are joined lengthwise on the inner and outer sides of the tube and are provided at their outer edges with overlapping portions which project across the joint and are provided with coincident openings for the reception of the bail, and which have said overlapping portions secured together by an eyelet, substantially as set forth.

Witness my hand in the presence of two subscribing witnesses.

CHARLES L. BETTS.

Witnesses:
HOWARD L. FLETCHER,
JAMES SORIANO